Sept. 26, 1972     I. R. WEINGARTEN     3,694,338
CHEMICAL DETECTOR
Filed April 14, 1970
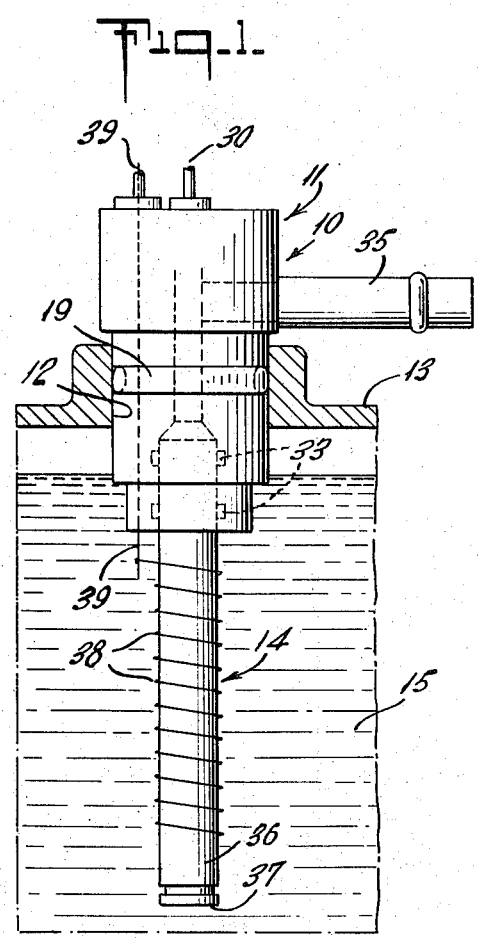
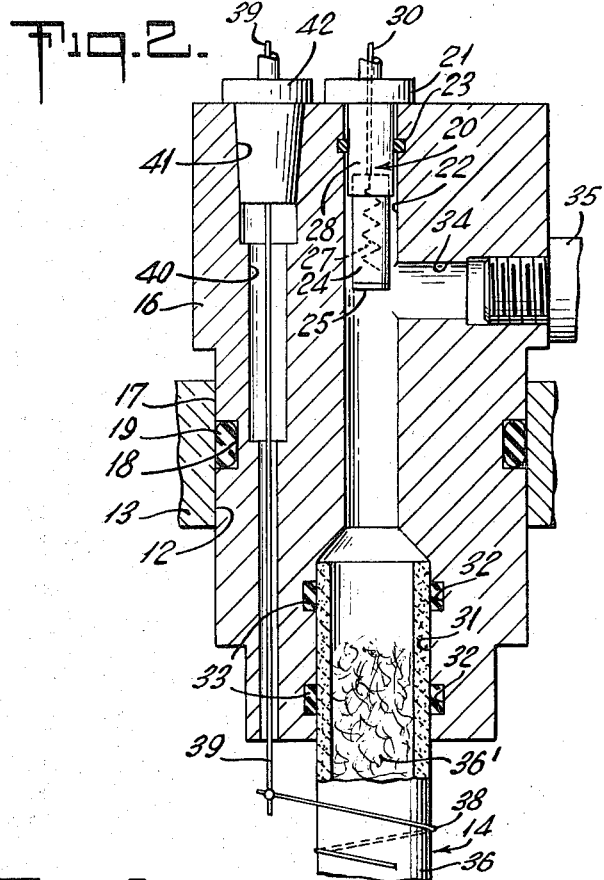
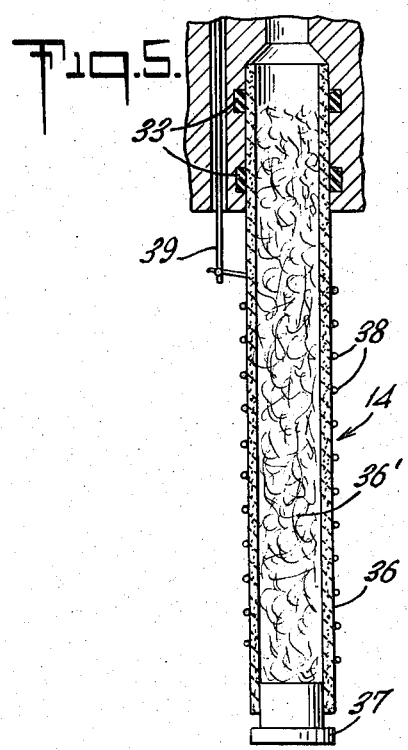
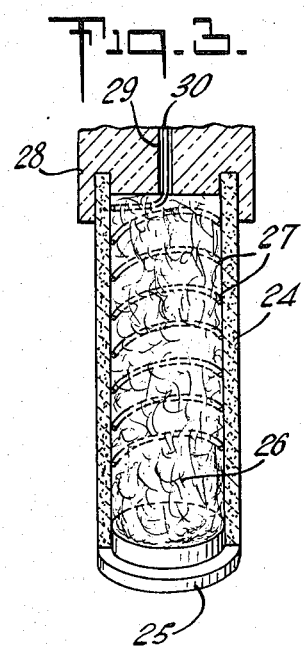
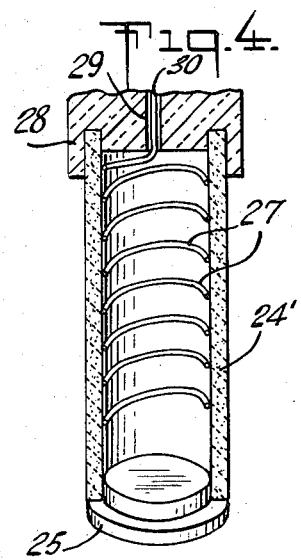
INVENTOR
IRVING R. WEINGARTEN
BY
ATTORNEY

United States Patent Office 3,694,338
Patented Sept. 26, 1972

3,694,338
CHEMICAL DETECTOR
Irving R. Weingarten, Bronx, N.Y., assignor to Cambridge Instrument Company, Inc., Ossining, N.Y.
Filed Apr. 14, 1970, Ser. No. 28,433
Int. Cl. B01r 3/00; G01n 27/00
U.S. Cl. 204—195 R                                    10 Claims

ABSTRACT OF THE DISCLOSURE

A detector for reducing and oxidizing agents carried by fluids which detector includes an electrolyte, a replaceable first half cell structure containing a metal and a metal salt immersed in said electrolyte and a second half cell structure having an exposed porous member saturated with said electrolyte and an electrode on the outer side of said porous member, the porous member and electrode upon being individually placed in the path of the fluid will cause a potential to be developed between the electrodes which is proportional to the amount of chemical in said fluid. The detector is especially useful for the detection of hydrazine in boiler feed water.

---

This invention relates to a chemical detector and more specifically to a novel and improved detector for detection of the presence of chemicals in fluids and is particularly useful for the detection of hydrazine in boiler feed water.

Prior known devices for the detection of reducing and oxidizing agents have generally embodied an arrangement utilizing an elongated porous tube having a metal electrode wound about the outer surface thereof, an inner electrode extending into or in close proximity to the porous tube and means for feeding an electrolyte into the tube to saturate the tube and contact the external electrode. With this arrangement a gas or liquid contacting the external electrode and carrying a chemical such as hydrazine to be detected would produce a chemical reaction and cause a voltage to be developed between the electrodes. The developed voltage was proportional to the quantity of the chemical being detected in the fluid and was measured by a suitable indicator. In the case of a hydrazine detector, the outer electrode was a platinum wire while the inner electrode was formed of silver together with silver oxide. Since the silver oxide in the form of powder was merely poured into the detector and about the silver electrode much of the powder washed through the porous tube with the result that the life of the cell was limited and refilling was a relatively difficult and time consuming procedure. Moreover, after testing cells prior to shipment, all silver oxide had to be removed and the cell completely dried and refilled for shipment.

This invention overcomes the disadvantages heretofore encountered with this general class of detectors and provides a novel and improved detector which is formed of two individual and independently replaceable half cells coupled by a common electrolyte. In the case of a hydrazine detector utilizing platinum as one electrode and silver and silver oxide as the other electrode, individual assemblies can be fabricated and be mounted in any desired spacial relationship provided, however, that both assemblies are immersed in a common electrolyte. Furthermore, since the silver electrode and the silver oxide form part of an individual readily replaceable structure, the assembly of the silver electrode and silver oxide as an individual half cell unit greatly simplifies manufacture and maintenance of the detector and only the silver-silver oxide half cell in the case of a hydrazine detector need be periodically replaced. With this arrangement, cells can be readily tested prior to shipment and replacement of the silver-silver oxide half cell can be accomplished quickly and easily. The same advantages obtain with half cell structures used in the detection of other reducing as well as oxidizing agents.

Another object of the invention resides in the provision of a novel and improved detector for hydrazine and other chemicals which affords increased life and sensitivity.

Still another object of the invention resides in the provision of a novel and improved detector embodying means for accurately controlling the flow of electrolyte in order to obtain maximum sensitivity with a minimum loss of electrolyte.

The above and other objects and advantages of the invention will become more apparent from the following description and accompanying drawings forming part of this application.

In the drawings:

FIG. 1 is a side elevational view of a detector in accordance with the invention with one half cell immersed in a fluid for the detection of a chemical such as hydrazine which may be carried by the fluid;

FIG. 2 is an enlarged cross-sectional view of a fragmentary portion of the detector shown in FIG. 1;

FIG. 3 is an enlarged cross-sectional view of one embodiment of a silver-silver oxide half cell used in the detector shown in FIGS. 1 and 2;

FIG. 4 is a modified embodiment of a half cell illustrated in FIG. 3; and

FIG. 5 is an enlarged cross-sectional view of the second half cell of the detector of FIGS. 1 and 2 and which is immersed in the fluid carrying the chemical to be detected.

The chemical detection cell in accordance with the invention is generally denoted by the numeral 10 and comprises a housing 11 secured in an opening 12 of a pipe or conduit 13 with the electrode assembly or half cell 14 immersed in the fluid 15 carrying the chemical to be detected.

More specifically the housing 11 is formed of a suitable insulating material and has an enlarged annular upper portion 16 and a lower portion 17 of reduced diameter. The portion 17 includes an annular recess 18 for receiving an O-ring 19 in order to seal the housing in the conduit opening 12.

The detector is provided with two separate half cell structures which as will be shown are coupled by a suitable electrolyte. As pointed out above, one half cell is generally denoted by the numeral 14 while the other half cell or reference cell is denoted by the numeral 20. The replaceable half cell 20 is of cylindrical configuration having an enlarged cap 21, a cylindrical member 28, and a porous member 24 carried by the member 28 and extending downwardly within a passage 22 in the housing 11. The half cell is sealed within the passage 22 in any suitable manner as by means of a gasket or O-ring 23 so that the cell can be readily removed for repair or replacement.

While the half cell 20 may have any desired configuration, one form for use in connection with the detection of reducing agents such as hydrazine in boiler feed water is illustrated in FIG. 3. It comprises an elongated tube 24 of a porous material such as a porous ceramic which will not be affected by the electrolyte. The bottom end of the tube 24 is closed by a cap 25 cemented or otherwise permanently secured therein. The tube is filled with a fibrous material 26 impregnated with a silver compound such as silver oxide and a silver wire 27 is wound about the fibrous material. The tube 24 is secured to the member 28 by cementing or other suitable means. An opening 29 extends through the cap 21 and member 28 and the upper end 30 of the silver electrode 27 extends upwardly through the opening 29 to facilitate attachment to suitable electrical recording or indicating means.

The lower portion of the opening 22 in the housing 11 is enlarged as indicated at 31 and has a pair of annular grooves 32 to receive O-rings 33. The upper portion 16 of the housing 11 further includes an opening 34 which intersects the opening 22 and threadably receives a connector 35 for introduction of an electrolyte into the passage 22.

The half cell 14 includes an elongated tubular porous member 36 which is closed at the bottom by a plub 37. The outside diameter of the porous member 36 is approximately equal to the internal diameter of the opening 31, and if desired, may be cemented in position therein. The electrode 38 preferably of platinum or other stable conductor is wound about the outer surface of the member 36 and is attached to a conductor 39 extending through an opening 40 in the housing 11. The upper end of the opening 40 has an enlarged portion 41 to receive a plug 42 through which the conductor 39 passes for attachment to the external indicator or recorder. The plug 42 is preferably cemented within the upper portion 41 of opening 40 and the conductor 39 is sealed within the plug 42.

With the arrangement as described above, when an electrolyte such as 2 to 2½ percent solution of sodium hydroxide is fed through the opening 34 and saturates both half cells, the presence of hydrazine in boiler feed water will produce a voltage between the conductors 30 and 39. More specifically actual tests have indicated the generation of a minimum of 4 millivolts as the open circuit voltage when 10 p.p.b. of hydrazine is present in water flowing at the rate of 100 milliliters per minute passed the half cell portion 14.

Inasmuch as it is essential that the electrolyte saturates the porous tube 36 so that the electrolyte will be present at the surface thereof and therefore in contact with the platinum electrode 38, the flow of the electrolyte is desirably controlled in order to provide maximum sensitivity with the least electrolyte flow. It is generally difficult to control the precise porosity of the tube 36 and it has been found that by impregnating that portion of the porous member 36 above the electrode 38 with a wax which is inert to any chemical present and then filling it with cotton 36' or other fibrous material, flows of the order of 0.2 milliliter per hour to as high as 3 milliliters per hour can be maintained accurately. The normal flow is preferably maintained in the order of 1 milliliter per hour. Cotton has been found particularly useful in hydrazine detectors inasmuch as it is not affected by the sodium hydroxide solution. Moreover, by utilizing cotton as the fibrous material 26 in the half cell 20, it has been found that the sodium hydroxide solution tends to bind the silver oxide more firmly to the cotton. It is evident, however, that other materials may be utilized depending on the specific electrolyte.

A modified embodiment of the half cell 20 is illustrated in FIG. 4. In this embodiment the porous tube 24' is impregnated with silver oxide and the silver electrode 27 is inserted within the tube 24' and in contact with the inner wall thereof.

The invention as described above utilized silver and silver oxide as the reference half cell and a suitable electrolyte such as an aqueous solution of sodium hydroxide. While hydrazine and other reducing agents may be detected by the foregoing reference cell and electrolyte, it is understood that other types of metals and salts of metals may also be employed. For instance, other metallic salts such as a chloride or other halides may be used. Gold with a suitable gold salt may also be used for the detection of compounds that may be classed as reducing agents. The half cell 14 can use any conductor in place of platinum provided it is relatively stable and is not the same metal used in the reference cell. When detecting oxidizing agents the reference cell may include a more active metal and perhaps its salts or compound such as cadmium hydroxide. In this case an acidic electrolyte would be used such as a 1 percent aqueous solution of hydrochloric acid.

The indicating means not shown may take any suitable form as for instance a recording or indicating voltmeter. In normal practice, it has been found desirable to arrange the indicating circuit to have an input resistance of approximately 5,000 ohms for maximum sensitivity with optimum damping.

With the invention as described above it has been found that by confining or otherwise retaining the compound of the metal in the first half cell about the electrode of that half cell by means of a separate porous barrier, the loss of the salt is minimized and the life of the detector is not only materially extended but vastly improved sensitivity is obtained throughout the life of the detector. The improved sensitivity is believed to occur by reason of the fact that excessive amounts of the metal compound flowing through the porous member of the second half cell tends to coat or otherwise contaminate the associated electrode. With this invention, however, the first half cell can be replaced many times with little if any loss in sensitivity of the detector.

While only certain embodiments of the invention have been illustrated and described, it is apparent that alterations, modifications and changes may be made without departing from the true scope and spirit thereof as defined by the appended claims.

What is claimed is:

1. A detector for reducing and oxidizing agents carried by a fluid comprising a hollow housing including a chamber, a first replaceable half cell structure having a first metal electrode, a porous body containing a compound of said metal in solid form and in contact with said electrode, said body retaining said compound about said electrode, said structure extending into said chamber in said housing, a second half cell structure including an elongated porous member having first and second ends, said first end extending out from said housing and said second end communicating with said chamber, said second half cell including a second metal electrode carried on the outside of said porous member around said first end and means for feeding an electrolyte into said chamber in said housing, said electrolyte filling said chamber and contacting at least a portion of the metal electrode and metal compound of the first half cell and flowing slowly through said porous member to contact said second metal electrode whereby an agent in the presence of said second electrode and electrolyte generates electrical energy between said electrodes having a magnitude proportional to the quantity of said agent.

2. A detector according to claim 1 wherein said agent is a reducing agent, said first half cell comprises a silver electrode and said metal compound is an oxide of silver, said second metal electrode is platinum and said electrolyte contains an alkali.

3. A detector according to claim 1 wherein said first half cell comprises a porous ceramic tube extending into said chamber, said first electrode extends into the last said tube and said metal compound is carried by said tube.

4. A detector according to claim 3 wherein said first electrode is silver, said metal compound is silver oxide carried by a fibrous material within said tube and said electrolyte contains sodium hydroxide.

5. A detector according to claim 3 wherein said porous tube is impregnated with a silver compound and said first electrode is silver and is carried on the inner wall of said impregnated tube.

6. A detector according to claim 3 wherein said porous member of said second half cell is tubular and contains a fibrous material to control the flow of electrolyte and said second electrode is platinum.

7. A detector according to claim 6 wherein said porous tube is impregnated with a silver compound and said first electrode is carried on the inner wall of said impregnated tube.

8. A detector according to claim 7 wherein said electrolyte contains sodium hydroxide.

9. A detector according to claim 6 wherein said first electrode is silver, said metal compound is silver oxide carried by a fibrous material within said tube and said electrolyte contains sodium hydroxide.

10. Apparatus for detecting the presence of chemicals in a fluid comprising a first replaceable unitary half cell structure containing a metal electrode and a metal compound in a solid state and means retaining said compound about said electrode, a second half cell structure comprising a porous support and a metal electrode carried by said support, hollow housing means at least partially enclosing said first half cell, means securing said porous support of said second half cell to said housing and in communication with the hollow interior thereof to define a fluid conduit between said first half cell and said support means with at least part of said porous support and said second electrode extending therefrom, said porous support and second electrode being adapted to be positioned in the path of said fluid, and means feeding an electrolyte through said fluid conduit to form a salt bridge between said half cells whereby the presence of a chemical in the fluid surrounding said second half cell will generate electrical energy between said electrodes.

References Cited

UNITED STATES PATENTS

| | | | |
|---|---|---|---|
| 3,432,403 | 3/1969 | Glass et al. | 204—195 R |
| 2,651,612 | 9/1953 | Haller | 204—195 R |
| 3,051,631 | 8/1962 | Harbin Jr., et al. | 204—195 R |
| 3,235,477 | 2/1966 | Keyser et al. | 204—195 P |
| 3,305,469 | 2/1967 | Poulos | 204—195 R |
| 2,851,654 | 9/1958 | Haddad | 204—195 R |
| 2,744,061 | 5/1956 | De Ford et al. | 204—195 T |

FOREIGN PATENTS

| | | | |
|---|---|---|---|
| 644,651 | 1937 | Germany | 204—195 F |

JOHN H. MACK, Primary Examiner

R. J. FAY, Assistant Examiner

U.S. Cl. X.R.

204—195 F